United States Patent [19]

Leiber et al.

[11] 4,357,055

[45] Nov. 2, 1982

[54] HYDRAULIC BRAKE FORCE AMPLIFIER

[75] Inventors: Heinz Leiber, Leimen; Robert Mergenthaler, Heidelberg, both of Fed. Rep. of Germany

[73] Assignee: Robert Bosch GmbH, Stuttgart, Fed. Rep. of Germany

[21] Appl. No.: 198,089

[22] Filed: Oct. 17, 1980

[30] Foreign Application Priority Data

Oct. 20, 1979 [DE] Fed. Rep. of Germany ....... 2942552

[51] Int. Cl.³ .............................................. B60T 11/24
[52] U.S. Cl. ......................................... 303/52; 303/9
[58] Field of Search ............... 303/9, 10, 13, 52, 84 R, 303/114

[56] References Cited

U.S. PATENT DOCUMENTS

| | | | |
|---|---|---|---|
| 3,672,729 | 6/1972 | Blakey | 303/9 |
| 3,927,915 | 12/1975 | Adachi | 303/52 X |
| 4,015,881 | 4/1977 | Adachi | 303/114 |
| 4,286,826 | 9/1981 | Leiber | 303/114 |

*Primary Examiner*—Duane A. Reger

*Attorney, Agent, or Firm*—Edwin E. Greigg

[57] ABSTRACT

A hydraulic brake force amplifier is proposed, which has a control valve actuatable via a travel-imparting spring which directs the exertion of pressure medium from a supply source as an auxiliary force.

The travel-imparting spring disposed subsequent to the brake pedal provides sensitive response by the control valve. If the auxiliary force fails, the action of the travel-imparting spring is precluded, so that pedal travel is not used unnecessarily.

In order to effect this preclusion, a barrier piston is used, which is exposed on one side to the force of a spring and on the other side to a varying pressure, so that it does not seize due to corrosion and always remains in a functionally ready condition.

The combination of the brake force amplifier with an anti-wheel-lock apparatus is possible.

The hydraulic brake force amplifier is preferably applicable in vehicle braking systems for passenger cars and light trucks.

8 Claims, 2 Drawing Figures

HYDRAULIC BRAKE FORCE AMPLIFIER

BACKGROUND OF THE INVENTION

The invention relates to a hydraulic brake force booster for a vehicle braking system having a control valve which is actuated by a brake-force exerted by a brake pedal. The distance of brake pedal movement is determined by a travel-imparting spring. The braking system monitors hydraulic pressure in connections between a supply source and a main cylinder, which receives a piston of the brake force booster, and between the main cylinder and a relief source. A cutoff assembly is provided to release the limits imposed on the travel-imparting spring in response to failure in the supply pressure. The cutoff assembly also includes a barrier piston which is subject to an arresting pressure. A brake force booster of this kind is known (German Offenlegungsschrift No. 26 09 905 corresponding U.S. Pat. No. 4,094,554). In brake force boosters of this kind, a problem exists wherein the cutoff assembly is actuated only very seldom—in fact, only if the supply pressure fails. The cutoff assembly can become sluggish as a result and then cannot be capable of functioning in an emergency.

In the case of integrated hydraulic brake boosters having a control valve located parallel to and beside the main cylinder or cylinders, the problem is still more complex. The push rod which actuates the control valve must be supported, once the control valve has switched over to the braking direction, on a stop to provide the driver with a sense of brake pressure exerted. This is accomplished with the travel-imparting spring which is disposed between the control valve and the pedal. If this stop were not present in the apparatus, then the pedal force would not increase any further after the brake pressure exertion point of the control is reached; it would remain virtually constant, until finally the pedal push rod reached the piston in the main cylinder. Only then, if the brake pedal is depressed still further, would there be a further increase in the counteracting force. This is unfavorable in human-engineering terms.

Accordingly, it has been proposed to use an auxiliary piston dependent on supply pressure. In the event the supply pressure fails, the auxiliary piston pushes open a check valve which has previously kept a chamber closed, the movable wall of which is formed by a barrier piston which supports the control valve. This solution has the disadvantage, however, that the auxiliary piston comes into action very infrequently. There is thus the danger that if a failure of supply pressure already exists, a previously unknown defect in the device could prevent optimal functioning of the brake force booster.

OBJECT & SUMMARY OF THE INVENTION

The hydraulic brake force booster as disclosed has the advantage over the prior art that the device is put into motion more frequently and cannot seize as a result of corrosion. The brake system is used in a vehicle braking system having a control valve which is actuated by brakeforce exerted by a brake pedal. The distance of brake pedal movement is determined by a travel-imparting spring. The braking system monitors hydraulic pressure in connections between a supply source and a main cylinder which receives a piston of the brake force booster and between the main cylinder and a relief source. A cutoff assembly is provided to release the limits imposed on a travel-imparting spring in response to failure in the supply pressure. The cutoff assembly also includes a barrier piston which is subject to an arresting pressure which acts in an opposite direction to that of the rod-face of the control valve. The arrest pressure of the barrier piston can be unlocked with the aid of a valve.

In addition, the volume taken up by the arresting piston is very low, because its pressure-medium chamber is directly monitored by a valve.

The invention will be better understood and further objects and advantages thereof will become more apparent from the ensuing detailed description of two preferred embodiments taken in conjunction with the drawings.

DESCRIPTION OF THE PREFERRED EMBODIMENTS

Figure 1:
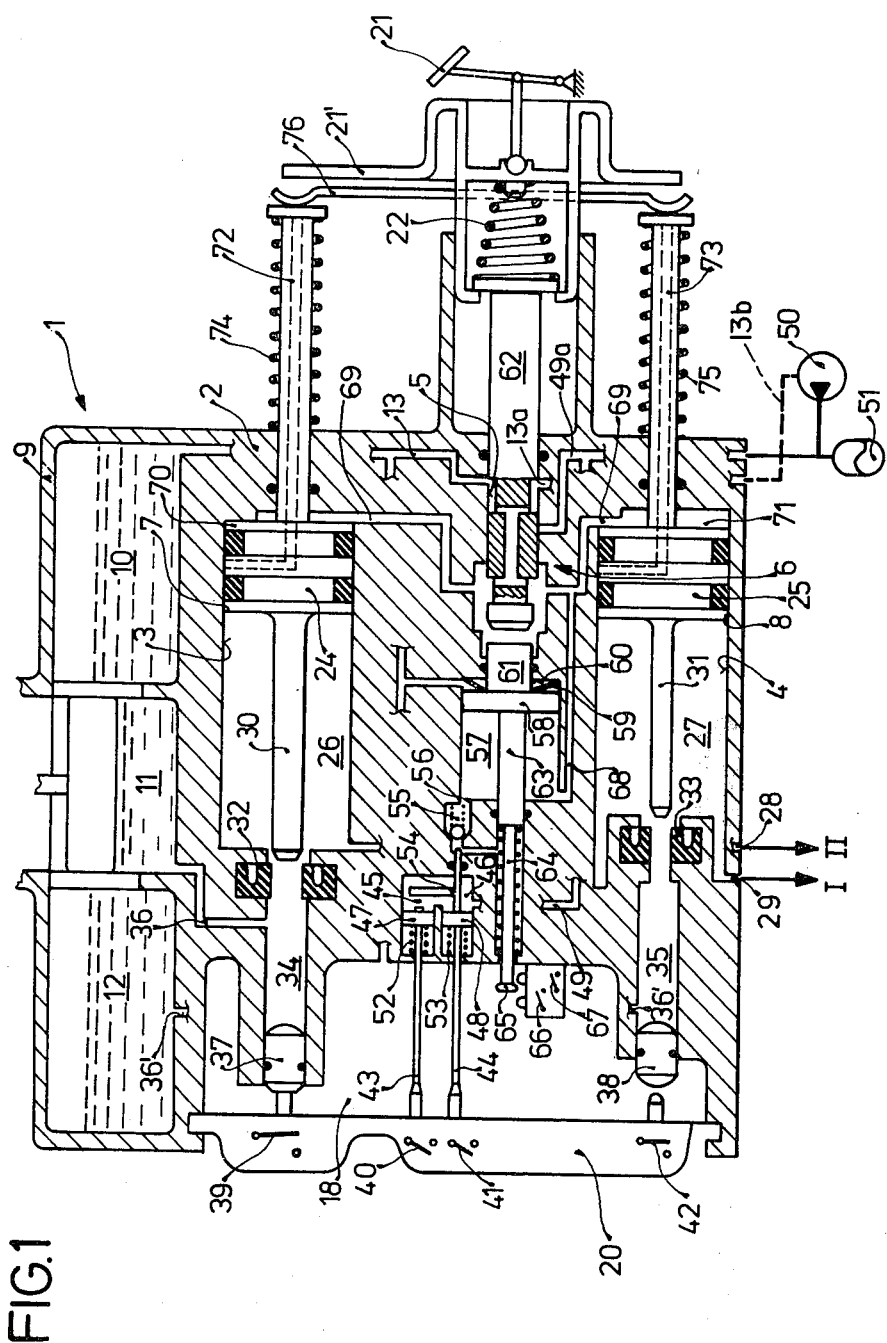
FIG. 1 shows a first exemplary embodiment of the brake booster.

A hydraulic brake booster 1 has a housing 2, in which three offset bores or cylinders 5, 4, and 3, which contain a control valve 6 and two main or booster cylinders 7, 8, respectively, are provided parallel to and beside one another. A refill container 9 having three chambers 10, 11 and 12 is located on top of the housing 2. The chamber 10 is connected to the control valve 6 via a channel 13 which also supplies fluid to the pump 50 via channels 13a and 13b.

The three offset bores 3, 4 and 5 discharge on one side into a chamber 18, which is covered toward the outside by a flat cover 20. This cover 20 carries various switches 39, 40, 41 and 42. Switches 39 and 42 are normally open and are actuatable by movable plugs 37 and 38, which are inserted into the ends of the bores 3 and 4 oriented toward the cover 20 as known in the prior art devices.

The two other switches 40 and 41 are a charge-function switch 40 for the supply pressure and a pressurefailure switch 41. Switches 40 and 41 are actuatable by the ends of piston rods 43 and 44, each of which, as a movable wall at the end opposite plate 20, defines one supply pressure chamber 45 and 46. The chambers 45 and 46 can communicate with one another. They are connected in common via a channel 49 to a pressure supply or source, consisting of reservior 51 and supplied by a pump 50 and are movable counter to the force of springs 52 and 53 under the effect of reservoir or supply pressure. Within the movement range of each piston 47 and 48, there is a push rod 54, which can open a check valve 55, which is disposed in a connecting line 56 leading to a barrier piston work chamber 57. With the pistons 47 and 48 under pressure in normal operation, the piston rods 43 and 44 are forced to the left thereby opening switches 40 and 41. Switches 40 and 41 close when the pistons 47 and 48 move to the right due to a pressure loss in the reservoir 51 via channels 49. Due to a loss of pressure, the piston rod 54 opens check valve 55 which permits fluid in chamber 57 to escape through check valve 55. Control slide 62 can then force piston 58 to the left.

This work chamber 57 is partially defined by a barrier piston 58, which is supported via a plate spring 59 on a housing wall 60 and which has an axial protrusion 61. The axial protrusion 61 is spaced apart from a control slide 62 of the control valve 6 by a distance which is greater than the length of the valve opening stroke of the control slide 62. Fluid in work chamber 57 under normal operating conditions is supplied by the supply chamber 10 via channels 13, control valve 6 and channel 68.

A piston rod 63 of the barrier piston 58 penetrates the work chamber 57 and has a rod 63, 64 with a head 65, which actuates the two switches 67 or 66. The switch 66 is a brake-light switch, and the switch 67 is a supply-pressure switch.

The work chamber 57 is connected via a branch channel 68 to a pressure-change channel 69, which leads from the control valve 6 to two primary chambers 70 and 71 of the main cylinders 7 and 8 and which is connected via the control valve 6 with the refill container 9 via line 13. Upon actuation of a brake pedal 21 and associated displacement of the control slide 62 which moves to the left thereby opening channel 49' which feeds fluid under pressure of the reservoir and the pump through control valve 6, the pressure-change channel 69 connected with the pump 50 or the reservoir 51 for supplying fluid to chambers 70, 71 and 57. A travel-imparting spring 22, which enables a gradual exertion of the brake pressure, is disposed between the pedal 21 which is provided with a pedal plate 21', and the control slide 62.

Pistons 24 and 25 are movable in the two main cylinders 7 and 8, placing the secondary chambers 26 and 27 under pressure. These chambers 26 and 27 communicate via channels 28 and 29, and associated pressure transducers (not shown), with a front-axle brake circuit I and a rear-axle brake circuit II, respectively. Circuits I and II may also comprise an anti-wheel locking system. The pistons 24 and 25 carry rods 30 and 31, which extend into the secondary chambers 26 and 27 and upon braking pass through ring seals 32 and 33, which then close-off refill chambers 34 and 35 from the secondary chambers 26 and 27. When the brake is released, the pistons 24 and 25 move back to the right under the influence of the pressure in chambers 26 and 27 respectively such that, the refill chambers 34 and 35 communicate with the secondary chambers 26 and 27. The refill chambers 34 and 35 are closed at one end by means of the movable plugs 37 and 38 and communicate respectively via channels 36 and 36' with chambers 11 and 12 of the refill container 9, thus providing channels through which fluid in chambers 34 and 35 can be returned to the chambers for relief of for the pressurized fluid.

On the primary side, the pistons 24 and 25 are connected with guide or push rods 72 and 73 which, supported by springs 74 and 75, are actuatable by the brake pedal 21 via a crosspiece 76.

MODE OF OPERATION

The supply pressure exerted by the brake-force of brake pedal 21 via the travel-imparting spring 22 and the control valve 6 reaches the primary chambers 70 and 71 of the main cylinders 7 and 8 via channels 49a and 69 and simultaneously reaches the work chamber 57 of the barrier piston 58 via channel 68. Under this effective pressure on barrier piston 58, which is opposite to the brake-force direction, the barrier piston 58 performs a slight movement counter to the force of the plate spring 59. This slight but frequent movement helps to prevent seizing due to corrosion and actuates the brake-light switch 66. The pistons 24 and 25 are moved within the main cylinders 7 and 8 toward the left, the secondary chambers 26 and 27 are separated from the refill chambers 34 and 35 by movement of rods 31 and 32 which pass through the ring seals 32 and 33, and brake pressure is sensed via channels 28, 29 by pressure transducers (not shown) which generate signals to brake circuits I and II via the channels 28 and 29. Braking occurs.

When full brake pressure is exerted, the movement of switches 39 and 42 from an open position to a closed position is not permitted by the movable plugs 37 and 38; that is only if a defect in the braking system is not present.

The cutoff assembly which includes barrier piston 58, axial protrusion 61, pistons 47, 48, check valve 55 and push rod 54 act in the manner described below to remove or "cutoff" the end stop limits to the displacement of travel-imparting spring 22. After the control valve 6 has been fully actuated, the axial protrusion 61, which is carried by barrier piston 58, represents a displaceable end stop for the control valve 6. However, if the pressure in the reservoir 51 falls below a predetermined minimum pressure, then the pistons 47 and 48 move toward the right due to a fall in pressure in chambers 45 and 46 via channel 49 and opens the check valve 55 via push rod 54 opening check valve 55 permits fluid flow from chamber 57 to chambers 45 and 46 which are at this time at a lower pressure due to the drop in the reservoir pressure. Then the barrier piston 58 is able to move toward the left in a breakaway stroke and stops acting as a barrier to movement of control valve 6. Thus control slide 62 can be moved further to the left by pedal 21. The crosspiece 76 actuates the push rods 72 and 73, and the two main cylinders 7 and 8 are placed under pressure by the pedal 21 to provide a pressure that is sufficient for braking.

In other words, the spring is compressed whenever the slide of the control valve 6 strikes against the stop 61 and thus the path of the slide is terminated. However, when the reservoir pressure fails, the piston 58 and stop 61 for the control valve 6 moves toward the left and leaves the way clear for the slide 62 to move further to the left. Since the slide is able to move to the left, the spring is relieved of its tension by forcing the slide 62 further to the left. Now the travel-imparting spring 22 is not compressed at all any longer but remains stretched; the spring is no longer effective and the pedal plate 21' presses directly upon the main cylinder pistons 24 and 25, via the rods 72, 73, and the braking pressure is thereby generated by forcing fluid under pressure in chambers 26 and 27 into the brake circuits via channels 28 and 29 connected respectively thereto. Fluid passage back to the refill chambers is prevented since the rods 30 and 31 close off the chambers 26 and 27 from refill chambers 34 and 35 when the rods pass through the ring seals 32 and 33.

The two pistons 47 and 48 actuate the two switches 40 and 41, wherein the charge-function switch 40, which in the case of electromotor reservoir charging is responsible for the level of the reservoir charge and the pressurefailure switch 41 which is responsible for providing a warning whenever a lower pressure limit is reached. When pump 50 is driven by the combustion engine or by some other unit, the response threshold of the switch 40 should be above the pressure level set as the response value of switch 41.

It will be understood that the barrier piston 58 in accordance with the invention has a negligible space requirement as compared to those of the prior art.

Figure 2:
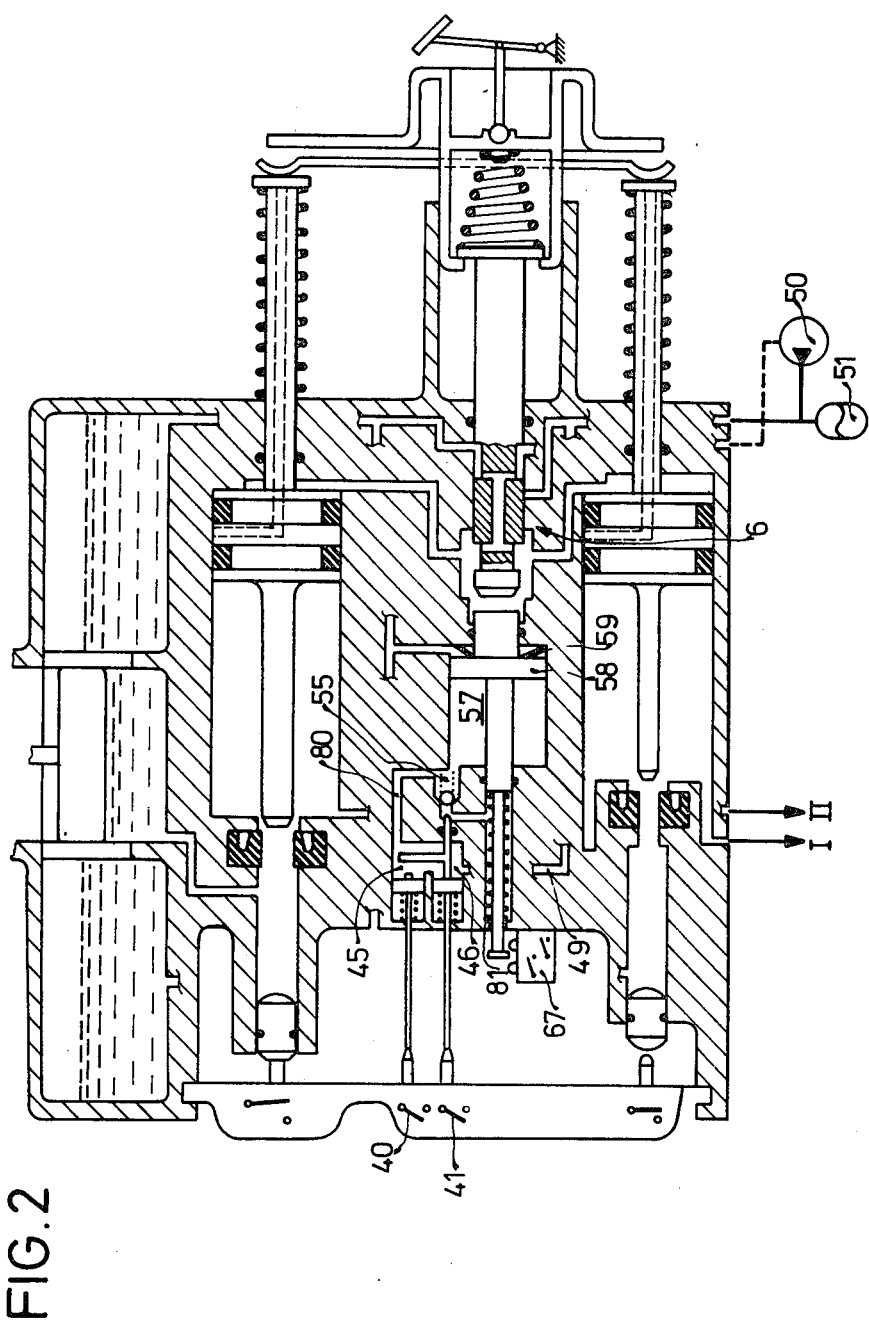
FIG. 2 shows a second exemplary embodiment of the brake booster.

As shown in FIG. 2, it is also possible to actuate the barrier piston by the reservoir pressure. Elements corresponding to those shown in FIG. 1 are given identical reference numerals.

Here the channel 49 serves not only to supply the supply-pressure chambers 45 and 46 but also supplies the work chamber 57 with supply pressure via a channel 80. The supply pressure is variable; in particular, it drops upon each occurrence of braking in accordance with the volume withdrawn. Upon each change in reservoir pressure, the force exerted upon the plate spring which moves the piston also varies.

In this variant as well, the barrier piston 58 can by unlocked by means of the valve 55.

The force of the plate spring 59 must be adapted, in this embodiment, to a spring 81 on the switch 67 in such a way that when the supply pressure is low the switch 67 responds before switching signals arrive from switches 40 and 41. If the switches 40 and 41 respond, without the switch 67 being actuated, then this is an indication of a problem in the barrier piston 58. On the other hand, when the full push rod force is exerted at the control valve 6, the switch 67 must not respond immediately, if the switches 40 and 41 have not yet been actuated, otherwise a false indication of supply pressure would be given.

It should also be noted that the barrier piston 58 may also be made up of a plurality of individual pistons disposed one behind the other or in-line and that the hydraulic brake force booster could be advantageously combined with a known anti-wheel-lock apparatus as disclosed in U.S. Pat. No. 4,141,595 to Leiber. In this case, the signals of the various switches can be processed in the electronic switching device of the antilocking apparatus.

It should further be noted that in the case of using a pedal plate actuated by the brake pedal, the barrier piston 58 can also be disposed outside the axis of the control valve instead of in-line so shown in FIGS. 1 & 2. When the barrier piston, arranged in this manner, is triggered, it then acts directly upon the pedal plate. If guide rods 72, 73 are provided at the location the arresting of the barrier piston 58 can also act upon the guide rods.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An hydraulic brake force booster for a vehicle braking system, wherein the system includes a brake pedal which exerts a brake-force; and wherein the hydraulic brake force booster includes: a control valve including a control slide,
    a travel-imparting spring connected between said control slide and said brake pedal plate such that movement of the brake pedal is limited in part by the travel-imparting spring;
    an end stop means for limiting movement of said control slide during normal pressure operation;
    at least one main piston;
    a pressure relief means;
    a pressure source;
    a main cylinder housing the at least one main piston and fluidly connected to the pressure source and the pressure relief means;
    said control valve being operative to regulate fluid flow, and is operatively connected to the brake pedal such that the control valve is actuated by a brake-force related to movement of said brake pedal and wherein the control valve regulates fluid flow between the at least one main cylinder and said pressure source; and between the at least one main cylinder and the pressure relief means; an end stop means for limiting movement of said control slide during normal pressure operation,
    a cutoff assembly including a barrier piston which is subject to an arresting pressure from said pressure source during normal operation, and wherein the cutoff assembly is operative to detect a failure in source pressure and to displace said end stop means for the travel-imparting spring in the event of such failure in source pressure;
    said cutoff assembly includes a valve to release the arrest pressure of the barrier piston and further wherein, due to the brake-force said travel imparting spring biases the barrier piston in a direction opposite to that of the arresting pressure.

2. An hydraulic brake-force booster as defined in claim 1, wherein the arresting pressure on said barrier piston comprises the pressure of the supply.

3. An hydraulic brake-force booster as defined in claim 1, wherein the arresting pressure on said barrier piston comprises the pressure exerted by the control valve.

4. An hydraulic brake-force booster as defined claim 1, further including:
    a spring mounted to bias the barrier piston in a direction opposite of the arresting pressure and wherein the arresting pressure is variable such that upon variation of the arresting pressure, the barrier piston executes a breakaway stroke.

5. A hydraulic brake-force booster as defined in claim 4, further including:
    at least one electric switch which is actuated by movement of the barrier piston to control a signal means wherein an indication of such barrier piston movement is generated upon actuation of the electric switch.

6. A hydraulic brake-force booster as defined in claim 1, wherein the barrier piston and the control valve are arranged coaxially and in-line with respect to one another.

7. A hydraulic brake-force booster as defined in claim 1, further including:
    a brake pedal plate connected between the travel-imparting spring and brake pedal and operative to actuate the at least one main piston upon supply pressure failure with movement of the barrier piston such that the brake pedal acts directly on the brake pedal plate.

8. A hydraulic brake-force booster as defined in claim 7, further including:
    at least one guide rod connected to guide the pedal plate and further connected such that the arrest pressure acts upon the guide rods.

* * * * *